US008512782B2

(12) United States Patent
Akamittath et al.

(10) Patent No.: US 8,512,782 B2
(45) Date of Patent: Aug. 20, 2013

(54) EMBOSSED CEREAL PIECE

(75) Inventors: Joseph George Akamittath, Bellevue, MI (US); Charles Aden Smith, Marshall, MI (US); Dave Helsen, Kalamazoo, MI (US)

(73) Assignee: Kellogg Company, Battle Creek, MI (US)

( * ) Notice: Subject to any disclaimer, the term of this patent is extended or adjusted under 35 U.S.C. 154(b) by 495 days.

(21) Appl. No.: 12/062,664

(22) Filed: Apr. 4, 2008

(65) Prior Publication Data
US 2008/0248165 A1 Oct. 9, 2008

Related U.S. Application Data

(60) Provisional application No. 60/910,277, filed on Apr. 5, 2007.

(51) Int. Cl.
A23P 1/00 (2006.01)

(52) U.S. Cl.
USPC ............. 426/383; 426/87; 426/446; 426/502; 426/503; 426/523

(58) Field of Classification Search
USPC .................. 426/502–503, 94, 559, 440, 445, 426/446, 447, 449, 450, 458, 462, 87, 383, 426/618–621
See application file for complete search history.

(56) References Cited

U.S. PATENT DOCUMENTS

| | | | | |
|---|---|---|---|---|
| 713,795 A | * | 11/1902 | Perky | 426/560 |
| 1,399,873 A | * | 12/1921 | Powell | 425/299 |
| 1,946,803 A | | 2/1934 | McKay | |
| 2,338,588 A | | 1/1944 | Kishlar et al. | |
| 3,494,302 A | * | 2/1970 | Wolf et al. | 426/275 |
| 3,512,990 A | | 5/1970 | Slaybaugh | |
| 4,004,035 A | | 1/1977 | Hirzel et al. | |
| 4,276,800 A | * | 7/1981 | Koppa et al. | 83/863 |
| 4,606,923 A | * | 8/1986 | Ricke | 426/496 |
| 4,732,770 A | | 3/1988 | Welygan et al. | |
| 4,789,555 A | * | 12/1988 | Judd | 426/503 |
| 4,940,593 A | * | 7/1990 | Duffy | 426/94 |
| 5,176,936 A | * | 1/1993 | Creighton et al. | 426/618 |
| 5,558,890 A | * | 9/1996 | Brown et al. | 426/94 |
| 5,759,603 A | | 6/1998 | Francisco et al. | |
| 5,846,588 A | | 12/1998 | Zimmermann et al. | |
| 5,876,777 A | | 3/1999 | Zimmermann et al. | |
| 5,914,140 A | * | 6/1999 | Kamper et al. | 426/89 |
| 5,942,268 A | | 8/1999 | Zimmermann et al. | |
| 6,004,612 A | | 12/1999 | Andreski et al. | |

(Continued)

FOREIGN PATENT DOCUMENTS

EP 107289 A2 * 5/1984

Primary Examiner — Drew Becker
Assistant Examiner — Luana Z Long
(74) Attorney, Agent, or Firm — Dickinson Wright PLLC

(57) ABSTRACT

A food piece with a first dough sheet having a first inner surface, a first outer surface, and a first peripheral edge. The food piece also includes a second dough sheet having a second inner surface, a second outer surface, and a second peripheral edge. The first peripheral edge of the first dough sheet is joined together with the second peripheral edge of the second dough sheet to define a perimeter. The food piece also includes an embossment positioned within the perimeter. The embossment extends upon at least one of the first outer surface and the second outer surface and includes at least one line along which the first and second dough sheets are joined.

8 Claims, 4 Drawing Sheets

(56) References Cited

U.S. PATENT DOCUMENTS

| | | | |
|---|---|---|---|
| 6,165,530 A * | 12/2000 | Mathew et al. ............... 426/446 |
| 6,168,817 B1 | 1/2001 | Pavan |
| 6,242,034 B1 | 6/2001 | Bhaskar et al. |
| 6,475,540 B1 | 11/2002 | Howling et al. |
| 6,607,765 B2 | 8/2003 | Capodieci |
| 6,720,015 B2 | 4/2004 | Prosise et al. |
| 6,899,905 B2 | 5/2005 | Prosise et al. |
| 2004/0022901 A1 | 2/2004 | Funk |
| 2004/0166202 A1 | 8/2004 | Prosise et al. |
| 2006/0059965 A1 | 3/2006 | Benstead |

\* cited by examiner

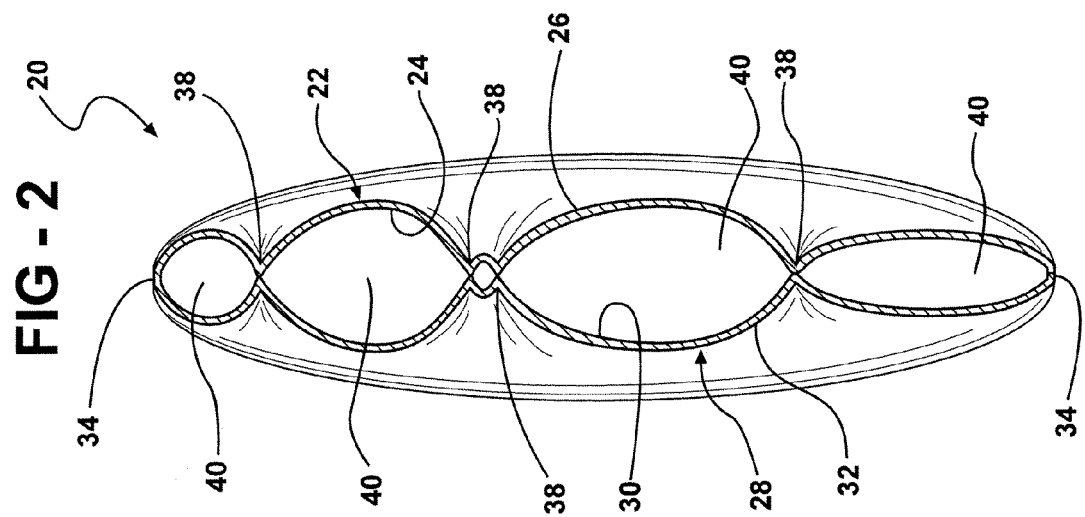
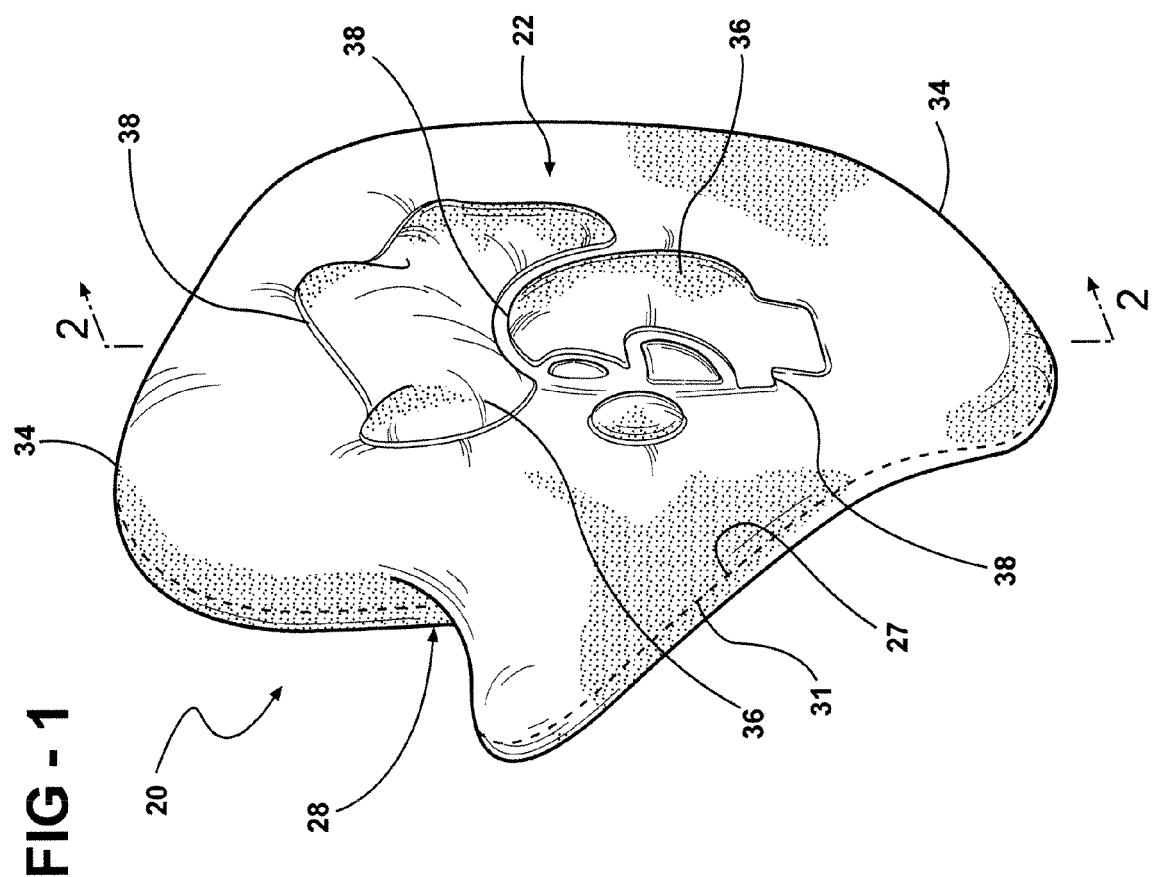

EMBOSSED CEREAL PIECE

CROSS-REFERENCE TO RELATED APPLICATIONS

This application claims the benefit of U.S. Provisional Patent Application Ser. No. 60/910,277 for an EMBOSSED CEREAL PIECE, filed on Apr. 5, 2007, which is hereby incorporated by reference in its entirety.

BACKGROUND OF THE INVENTION

1. Field of the Invention

The subject invention relates generally to a food piece for ready-to-eat (RTE) cereals or cereal snack products and a method for making the food piece.

2. Description of the Prior Art

It is known in the art to make a food piece for RTE cereals from a multi-layer dough composition. For example, U.S. Pat. No. 6,168,817 to Pavan and U.S. Pat. No. 6,165,530 to Mathew et al. teach a food piece made from a first dough sheet and a second dough sheet joined together along a perimeter. Both Pavan and Mathew teach rolling dough into a pair of sheets, overlying the sheets on top of one another, and then cutting the individual pieces with a cutting tool that joins the two sheets along the perimeter.

SUMMARY OF THE INVENTION

In summary, the invention is a food piece for RTE cereals and a method for forming the food piece. The food piece includes a first dough sheet having a first inner surface, a first outer surface, and a first peripheral edge. The food piece also includes a second dough sheet having a second inner surface, a second outer surface, and a second peripheral edge. The first peripheral edge of the first dough sheet is joined together with the second peripheral edge of the second dough sheet to define a perimeter. The food piece also includes an embossment positioned within the perimeter. The embossment extends upon at least one of the first outer surface and the second outer surface and includes at least one line along which the first and second dough sheets are joined.

BRIEF DESCRIPTION OF THE DRAWINGS

Advantages of the present invention will be readily appreciated, as the same becomes better understood by reference to the following detailed description when considered in connection with the accompanying drawings wherein:

FIG. 1 is a perspective view of a food piece according to an exemplary embodiment of the present invention;

FIG. 2 is a cross-sectional view taken along line 2-2 of FIG. 1;

DETAILED DESCRIPTION OF THE EXEMPLARY EMBODIMENT

Figure 3:
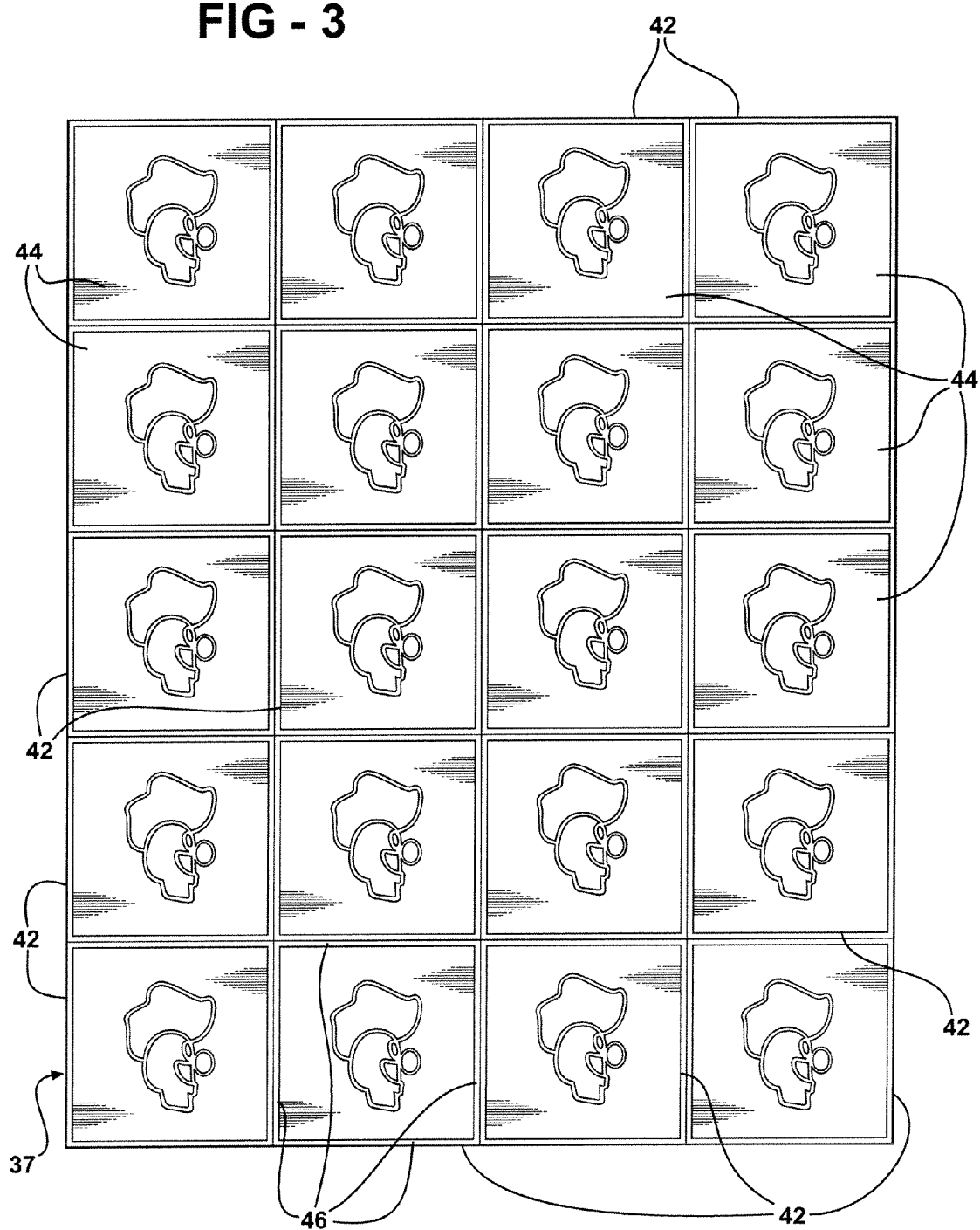
FIG. 3 is a plan view of an embossing tool according to an exemplary embodiment of the present invention.

Referring now to FIGS. 1 and 2, a food piece for RTE cereal or cereal snack product is generally shown at 20 and includes a first dough sheet generally indicated at 22 having a first inner surface 24, a first outer surface 26, and a first peripheral edge 27. The food piece 20 also includes a second dough sheet generally indicated at 28 having a second inner surface 30, a second outer surface 32, and a second peripheral edge 31. The first peripheral edge 27 extends coextensively with the second peripheral edge 31, and the peripheral edges 27, 31 are joined together to define a perimeter 34. The second inner surface 30 of the second dough sheet 28 faces the first inner surface 24 of the first dough sheet 22.

An embossment 36 is positioned within the perimeter 34 and extends visibly upon the first and second outer surfaces 26, 32 of the dough sheets 22, 28. The embossment 36 is formed by an embossing tool generally indicated at 37 that stamps the embossment 36 onto the first outer surface 26. The resulting embossment 36 interpenetrates the dough sheets 22, 28 to also visibly appear on the second outer surface 32. In this manner, two mirror-image embossments 36 can be formed on opposite sides of the food piece 20 with a single motion of an embossing tool 37 or die. Thus, while only the first outer surface 26 is visible in FIG. 1, it should be understood that an embossment 36 appears on the second outer surface 32.

According to the exemplary embodiment, the embossment 36 is formed as a plurality of lines 38 along which the dough sheets 22, 28 are joined together. The dough sheets 22, 28 are joined at the lines 38 in the same way that they are joined at the perimeter 34. Thus, as can be seen from FIG. 2, the first and second inner surfaces 24, 30 of the first and second dough sheets 22, 28 are spaced apart from one another to define a plurality of enclosed cavities 40 bounded by the perimeter 34 and the lines 38. The perimeter 34 and lines 38 are formed prior to baking or toasting the dough sheets 22, 28 and the cavities 40 come to exist while the dough sheets 22, 28 are baked or toasted. Referring again to FIG. 1, the lines 38 define an indicium positioned within the perimeter 34 on the outer surfaces 26, 32 of the dough sheets 22, 28. The indicium can take any desired form, such as alpha-numeric characters or sketched images. For example, the indicium could take the form of a symbol or a trademark that is associated with the food product.

Figure 4:
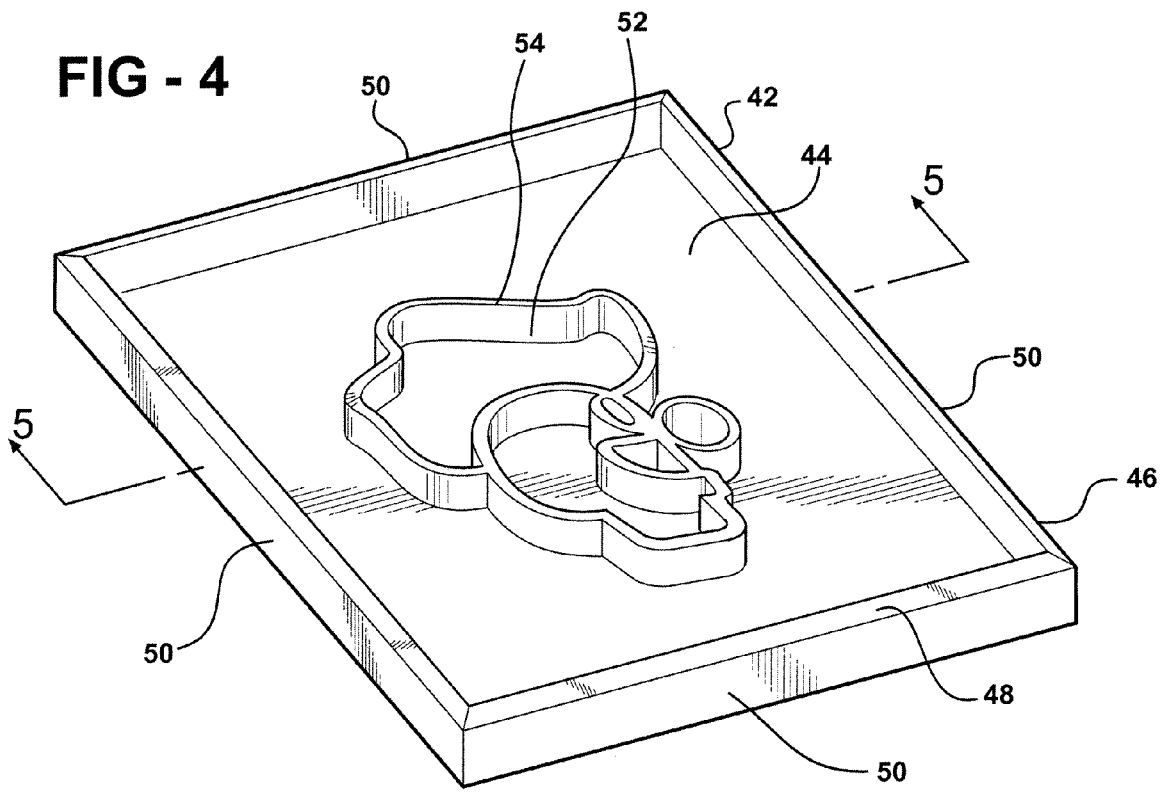
FIG. 4 is a perspective view of an embossing piece according to an exemplary embodiment of the present invention.
Figure 5:
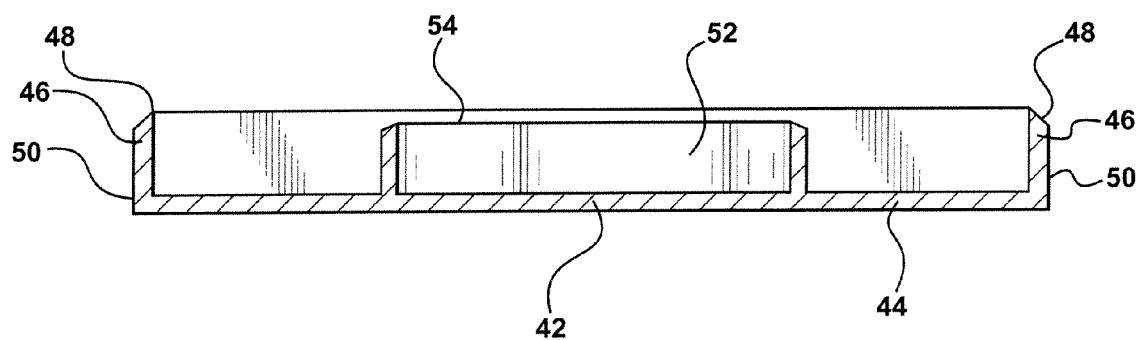
FIG. 5 is a cross-sectional view taken along the line 5-5 of FIG. 4.

Referring now to FIGS. 3-5, the embossing tooling 37 will now be explained in greater detail. The embossing tool 37 includes a plurality of embossing pieces 42. According to an exemplary embodiment, the embossing piece 42 is generally square, but may be any shape known to create the desired food piece 20. The embossing tool 37 is typically plastic or metal, but may be any material known to those skilled in the art and such material may be utilized for several factors, including but not limited to, dough sheet thickness, dough formulations, and production speeds.

The plurality of embossing pieces 42 are joined to form the embossing tool 37 by mating the edges 50 of adjacent embossing pieces 42. According to the exemplary embodiment, the embossing tool 37 is a 4 piece by 5 piece sheet, but may be any size. It should be appreciated, that the embossing tool 37, as shown in FIG. 3, is a hand cutting and embossing tool but the embossing tool 37 may be used in the manufacturing process with a rotary cutter and embosser or any other method known to those skilled in the art.

Each of the embossing pieces 42 include a base 44 and a cutting periphery 46 extending perpendicularly from the base 44 to a cutting end 48. The cutting end 48 may have a thickness from about a knives edge to 0.030 inches and such thickness may be adjusted for several factors, including but not limited to, dough sheet thickness, dough formulations, production speeds, and the type of cutter and embosser used and known by those skilled in the art. According to the exemplary embodiment, the cutting periphery 46 is defined by a plurality of edges 50.

Each of the embossing pieces 42 include an embossing portion 52 that extends perpendicularly from the base 44 to an embossing end 54. The embossing portion 52 typically has a thickness greater than 0.010 inches and such thickness may be adjusted for several factors, including but not limited to, dough sheet thickness, dough formulations, production speeds, and the type of cutter and embosser used and known by those skilled in the art.

The embossing portion 52 of the embossing piece 42 does not extend as far from the base as the cutting periphery 44 does. According to an exemplary embodiment, the cutting periphery 46 has a height of about 0.150 inches while the embossing portion 52 has a height of about 0.140 inches. This allows the cutting end 48 to cut the periphery 34 while the embossing the desired indicium in a single action. The cutting is performed by the embossing tool 37 that simultaneously embosses the dough sheets 22, 28. It should be appreciated that the height of the embossing portion 52 and cutting periphery 46 may be adjusted for several factors, including but not limited to, dough sheet thickness, dough formulations, production speeds, and the type of cutter and embosser used and known by those skilled in the art.

Figure 6:
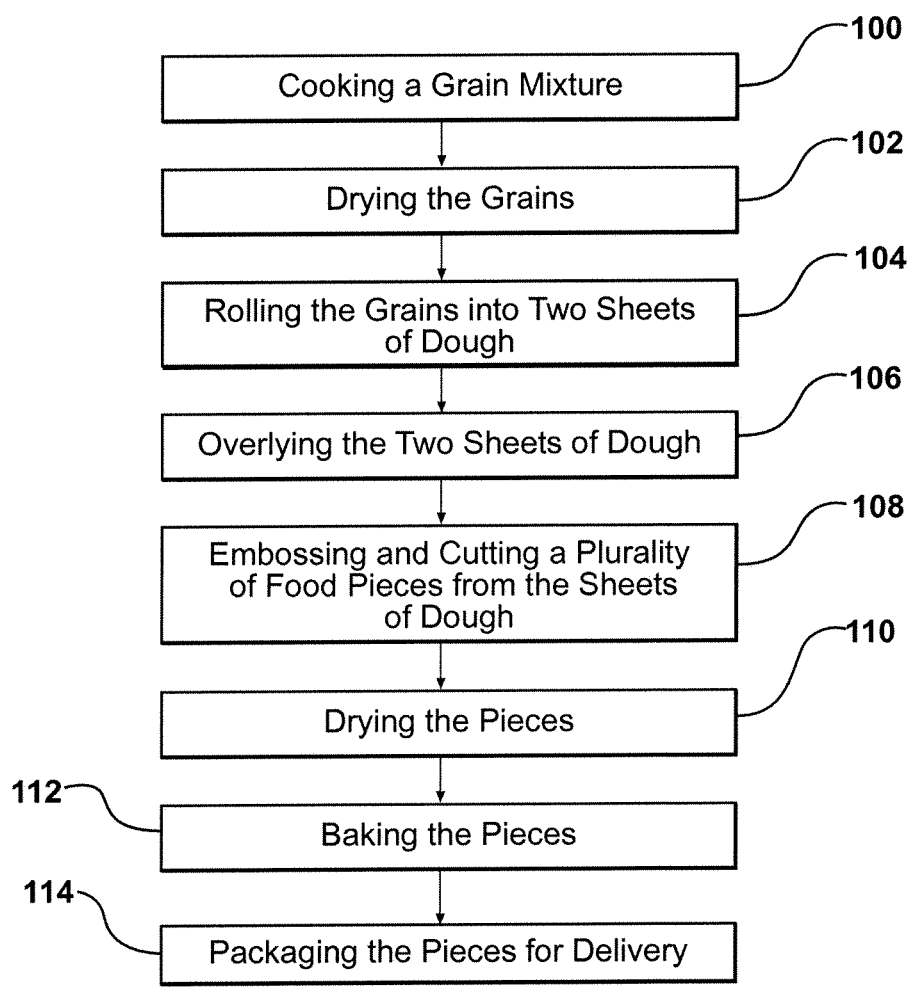
FIG. 6 is a flow chart showing a method of making a food piece according to an exemplary embodiment of the present invention.

Referring now to FIG. 6, a method of making RTE cereal food pieces 20 is disclosed. In the method of the present invention, making dough is an optional step. Pre-made dough may be used, or dough can be made according to the present disclosure. A dough composition is provided that includes a plurality of grains, or a mixture of grains such as rice, whole wheat grains, or brewers corn grits, for example. The necessary feature of the dough used in the present invention is that it is of such a consistency that it can be transferred through rollers to form a grooved or smooth surface. According to an exemplary embodiment, the dough composition includes about 30-50% by weight of rice, about 20-40% by weight of brewers corn grits, about 4-10% by weight of carbohydrates, and about 1-2% by weight of salt. The use of rice can result in a strong and flexible sheet. The brewers corn grits can eliminate hard spots in the finished product.

At step 100 of the exemplary method, enough water is added to achieve a moisture content of about 26%-34% by weight and the grains are cooked. Cooking of the grains useful in the dough is well-known in the art and includes heating the grain in contact with water or water vapor. This technique is often termed "pre-cooking" in cereal chemistry.

Additional methods of creating dough may be used. Such methods include, but are not limited to, extrusion cooking. With extrusion cooking at least one cereal flour is cooked with water to achieve a moisture content of about 20-30% by weight and make a cooked extrudate. U.S. Pat. No. 5,759,603 to Francisco et al., entitled "Process for Producing a Food Product Having a Distinct Phase," which discloses method for cooking by extrusion is hereby incorporated by reference.

At step 102, the grains are then allowed to cool to an ambient temperature, and then dried by exposure to a temperature of about 200-250 degrees F., to achieve a moisture content of about 22-24% by weight. In an exemplary embodiment, the grain mixture is dried by convection with air, but drying can be achieved by a heated conveyor belt or by other suitable drying methods. At this time a majority of the moisture content exist at the inner portion of the grains while the outer portion is dry. It is optional to include a tempering step to incorporate the moisture throughout the grains. According to an exemplary embodiment, tempering occurs as the grains are exposed to ambient air over a period of time. This period of time may be as short as the time it takes to move the grains to the next process, or for a set period of time to achieve the desired tempering. If extrusion cooking of cereal flours is utilized the drying step 102 is optional and the extrusion cooked cereal flours may proceed straight to the rollers in step 104. It is preferred in extrusion cooking to cook the cereal flours to achieve a moisture content of about 22-24% by weight, whereby the tempering and drying steps are not needed.

At step 104, the first and second dough sheets 22, 28 are formed by pressing the moist grains between rollers, thereby fusing the grains together into continuous sheets. In the exemplary embodiment, the use of a production line is preferred to form two measures of dough into two dough sheets 22, 28 having a grooved surface or a smooth surface through the use of first and second mills. The dough sheets 22, 28 may have a grooved surface and a smooth surface, two grooved surfaces, two smooth surfaces, or any combination of grooved and smooth surfaces. In particular, both mills include a grooved roller or a smooth roller depending on the desired texture. In the exemplary embodiment, both mills have the following configuration, one roller is smooth and the other roller has a grooved surface. The smooth roller presents a smooth surface extending circumferentially around the smooth roller to generate the smooth surface onto the dough.

When dough is passed through the grooved roller, a rectangular pattern is created by multiple grooves extending perpendicularly to one another. A first grooved surface extends circumferentially around the grooved roller, while a second grooved surface extends laterally along the grooved roller and perpendicular to the first grooved surface to generate the grooved rectangular surface in the dough. The grooves of the grooved surface, pre-bake, optimally measure 0.008 inches to 0.024 inches in width and 0.006 inches to 0.020 inches in depth, however, any grooved surface with grooves that are up to 0.004 inches to 0.048 inches in width and 0.004 inches to 0.040 inches in depth will be operable in the present invention. In other words, the ridges that form the grooves are preferably 0.008 inches to 0.096 inches apart, more preferably 0.016 inches to 0.048 inches and most preferably 0.024 inches to 0.040 inches. The height of the ridges are preferably 0.004 inches to 0.040 inches, more preferably 0.008 inches to 0.032 inches and most preferably 0.012 inches to 0.016 inches. U.S. Pat. No. 4,004,035 to Hirzel et al., entitled "Method and Apparatus for Producing Lapped Shredded Food Articles," which discloses a method for producing a shredded food product with multiple layers produced by lapping as opposed to overlaying is hereby incorporated by reference.

While the exemplary embodiment uses two dough sheets 22, 28 it should be appreciated that additional mills, such as a third mill, a fourth mill, etc., can be installed on the production line to produce a third sheet, fourth sheet, etc. Alternatively, a laminator can be used to create multiple layers from a single sheet.

To modify the thickness of the dough sheets, the rollers can be arranged closer together, for thin sheets, or farther apart, for thicker sheets. The dough sheets, are preferably 0.016 inches to 0.048 inches in thickness prior to baking, more preferably 0.020 inches to 0.040 inches in thickness, and most preferably 0.024 inches to 0.032 inches in thickness.

According to the exemplary embodiment, the dough sheets 22, 28 are then laid over one another in step 106, and a plurality of food pieces 20 are cut out from the sheets so as to be joined along the perimeter 34 at step 108. The cutting is performed by the embossing tool 37 that simultaneously embosses the dough sheets 22, 28. The embossing tool imprints at least one line 38 onto the first and second dough sheets 22, 28 to join the dough sheets 22, 28 together along the at least one line 38.

Cutting can include a wide variety of designs and configurations, and preferably includes a scrap-less design, i.e. no web return. Circle, square, rectangle, hexagon shapes are preferred. Often, a tessellation of cartoon characters will be desirable for children's snacks, and that embodiment is within the scope of the present invention. The cutting end 48 of the embossing tool 37 simultaneously knits or crimps the dough sheets 22, 28 together to create the food piece 20.

The food pieces 20 are then dried by exposing the food pieces 20 to a temperature of about 200-250 degrees Fahrenheit. Drying the food pieces 20 reduces the moisture content of the food pieces 20 to about 10-12% by weight.

The food pieces 20 are then baked or toasted in an oven at a temperature of about 350-550 degrees F. for about 5-25 minutes. According to step 112 of the exemplary embodiment, the dough sheets are baked or toasted to drive the moisture content to about 2-4% by weight by placing the food pieces 20 in a multi-stage oven. The food pieces 20 are exposed consecutively to a first zone at a temperature of about 530 degrees F., and a second zone at a temperature of about 400 degrees F. for a total of about 10 minutes. It is during this baking or toasting step 112 that the first and second dough sheets 22, 28 will separate to create the cavities 40. The perimeter 34 and lines 38 that are formed in the dough sheets 22, 28 prior to baking remain in contact during baking and the cavities 40 are created between the lines 38 and perimeter 34. Next, food pieces 20 may then be packaged for delivery at step 114.

Optionally, prior to packaging the food pieces 20, the food pieces 20 may be coated with a sugar frosting or glaze, as is well known in the art. U.S. Pat. No. 6,475,540 to Howling et al., entitled "RTE Cereals and Other Foods Presweetened with D Tagatose," discloses a known coating method in the art and is hereby incorporated by reference. These sugar frosted food pieces 20 are then subjected to a final drying step, in order to dry the coating prior to being packaged.

However, it should be appreciated that this method could also be used to make snack chips, which would be coated with an oil or tackifying agent and then may be dusted with a seasoning. Typically, these oil coated food pieces 20 do not require a final drying step like the sugar frosted food pieces 20 prior to packaging.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method of making a food piece for a ready-to-eat cereal with an embossing tool having a cutting periphery and an embossing portion comprising:
   forming a first sheet of dough and a second sheet of dough;
   overlying the first and second sheets of dough to create a multi-layered sheet of dough;
   mechanically cutting the multi-layered sheet of dough with the cutting periphery of the embossing tool to create a plurality of food pieces joined along a completely sealed perimeter;
   mechanically embossing the multi-layered sheet of dough with the embossing portion of the embossing tool simultaneously with said cutting step to interpenetrate at least one line onto the first and second sheets of dough within the perimeter of the food pieces for joining the first and second sheets of dough together along the at least one line and for defining two mirror-imaged indicium that are visibly appearable on both the first and second sheets of dough; and
   baking the food pieces to space apart the first and second sheets of dough from one another and create an enclosed cavity bounded by the completely sealed perimeter and the at least one line to further define the two minor-imaged indicium.

2. The method as set forth in claim 1 further including a step of baking the food pieces at a temperature of about 350-550 degrees F. to achieve a moisture content of about 2-4% by weight.

3. The method as set forth in claim 2 further including a step of drying the food pieces to achieve a moisture content of about 10-12% by weight prior to the baking step.

4. The method as set forth in claim 1 wherein the forming the first and second sheets of dough step includes:
   cooking a plurality of grains with water to achieve a moisture content of about 26%-34% by weight;
   drying the grains to a moisture content of about 22-24% by weight; and
   pressing the grains between rollers to fuse the grains into the first and second sheets.

5. The method as set forth in claim 1 wherein the forming the first and second sheets of dough step includes:
   extrusion cooking at least one cereal flour with water to achieve a moisture content of about 20-30% by weight to make a cooked extrudate; and
   pressing the cooked extrudate between rollers to form the first and second sheets.

6. The method as set forth in claim 1 further including a step of coating the food pieces.

7. The method as set forth in claim 6 further including a step of dusting the food pieces with a seasoning.

8. The method as set forth in claim 6 further including a step of drying the coating on the food pieces.

* * * * *